Oct. 5, 1954 L. H. CONNELL 2,690,882

APPARATUS FOR MAGNETIC RECORDING

Filed Sept. 20, 1948 4 Sheets-Sheet 1

*INVENTOR.*

LAWRENCE H. CONNELL

BY Whittemore, Hulbert & Belknap ATTORNEYS

INVENTOR.
LAWRENCE H. CONNELL
BY Whittemore, Hulbert & Belknap
ATTORNEYS

INVENTOR.
LAWRENCE H. CONNELL
BY Whittemore, Hulbert & Belknap
ATTORNEYS

APPARATUS FOR MAGNETIC RECORDING

Filed Sept. 20, 1948 4 Sheets-Sheet 4

*INVENTOR.*

LAWRENCE H. CONNELL

BY *Whittemore, Hulbert & Belknap*

ATTORNEYS

Patented Oct. 5, 1954 2,690,882

UNITED STATES PATENT OFFICE 2,690,882

APPARATUS FOR MAGNETIC RECORDING

Lawrence H. Connell, Detroit, Mich.

Application September 20, 1948, Serial No. 50,143

23 Claims. (Cl. 242—54)

The present invention relates to apparatus for magnetic recording, and more particularly to a cabinet set having replaceable cartridge units carrying a reel of wire recording.

It is an object of the present invention to provide improved wire handling apparatus, including an improved level wind device, means for feeding wire with greatly uniformity of speed, means for reversing the feed of wire for rewinding, automatic means for insuring that reversal of the wire feed motor is accompanied by reversal of the drive of the take-up mechanism and the proper changes in the level winding mechanism.

It is a feature of the present invention to provide for feed of wire by drawing the wire from the supply reel, and using the resulting rotation of the supply reel to apply a non-positive rotation to the take-up reel and a speed that tends to be in excess of the peripheral speed of the supply reel.

It is a further feature of the present invention to provide a novel drive mechanism between the reels to insure a smooth even rotation thereof.

It is a further feature of the present invention to provide a novel level wind mechanism including a sheave which is oscillated about an axis tangent to its periphery, and in which the wire is drawn off the reel at a point substantially 180° from the point of tangency of the axis of oscillation.

It is a further feature of the present invention to provide a novel snap-acting reversing means for the level wind device.

It is a further feature of the present invention to provide a replaceable cartridge adapted to be associated automatically by the simple act of insertion into a cabinet with the driving means for advancing the wire, the drive for the level winding device, the pick-up or recording head, and with means for reversing the level wind device.

Other objects and features of the invention will become apparent as the description proceeds, especially when taken in conjunction with the accompanying drawings, wherein.

Described in general terms and without reference to the figures of the drawings, the apparatus is intended primarily for a player for wire recordings, although it may include recording apparatus as well as reproducing apparatus. The cabinet includes the driving motors, speaker, amplifier circuit, and is so designed that simple insection of a replaceable cartridge effects mechanical and electrical connection to the appropriate parts of the cartridge. The cartridge contains a supply reel and a take-up reel, a level winding device, a wire feed capstan, means for reversing the level wind device, all designed to be associated with the corresponding mechanism in the cabinet. The design permits the most economical construction of the cartridge, the relatively complicated and expensive parts of the apparatus being permanently mounted in the cabinet.

The wire feed comprises a capstan in the cartridge engaged by a drive roller mounted in the cabinet. The capstan mechanically withdraws wire from the supply reel, imparting rotation thereto. The take-up reel is driven from the supply reel, and to effect its rotation, there is a shiftable double disc driver, formed of Phosphor bronze or the like, which receives discs secured to the reels. The driver is shiftable so as to overlap more or less of the two discs, and in effect constitutes a variable ratio drive, which however is non-positive in action. The take-up reel has associated therewith a level wind device which is comprised by a sheave mounted for oscillation about an axis tangent peripherally thereto along the line of advance of the wire to the sheave. The wire is led off the sheave at the opposite side, and its oscillation distributes the wire back and forth over the take-up reel. Associated with the drive for the level wind device is a level wind reversing lever, with a spring biased in opposite directions as the sheave is oscillated, arranged to effect snap-action of said lever.

A main reversing lever is associated with the cabinet, which is arranged to effect shifting of the double disc drive, and to clutch one or the other of the two level wind sheaves to its drive, so that level winding takes place during playing and rewinding of the wire.

The reels are preferably provided with contacts engaged by the wire on the reels, the contacts being so connected as to operate appropriate relays in the motor drive circuit. Thus, when the wire has been withdrawn from one reel to a point where it no longer engages both of the contacts, the circuit to the drive motor is interrupted, and the wire feed is stopped before the wire is withdrawn completely from one reel.

Figures 1, 2:
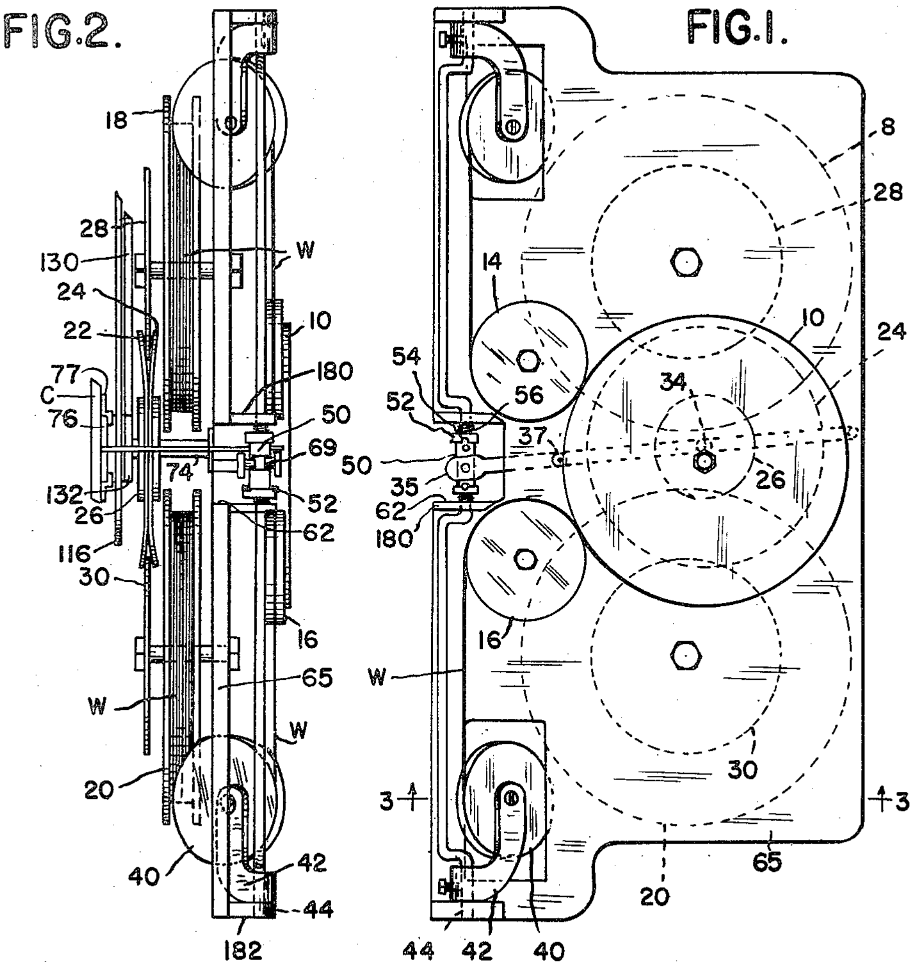
Figure 1 is a top plan view of the replaceable cartridge, with its cover removed.
Figure 2 is a front elevation of the cartridge seen in Figure 1.
Figure 3:
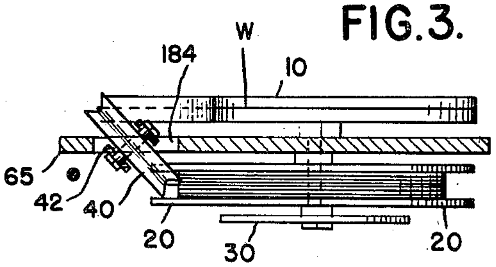
Figure 3 is a fragmentary section on the line 3—3 of Figure 1.

Referring now to Figures 1 to 3, the replaceable cartridge comprises essentially a single mounting plate carrying the apparatus. The structure as shown in these figures has the covers removed to expose the operating elements with greater clarity.

Referring first to Figures 1 to 3 and 5, the apparatus for feeding the wire W comprises a capstan 10 which is engaged by a driving rotor 12 permanently mounted in the cabinet and adapted to engage the periphery of the capstan 10. A pair of rollers 14 and 16, preferably rubber faced, are provided which also engage the periphery of the capstan 10 and maintain the wire in contact therewith throughout a very substantial extent, as, for example, in excess of 270°. The rollers 14 and 16 maintain the wire in contact with the capstan and as the capstan is rotated, have the effect of withdrawing wire from the one or the other of two reels 18 or 20.

One of the reels 18 or 20 is a supply reel and the other reel is a take-up reel onto which the wire withdrawn from the supply reel is wound. The capstan 10 may be driven in either direction so that after wire has been withdrawn from one reel and completely wound up on the other reel, the direction of rotation of the capstan may be reversed and the wire rewound upon the initial reel.

It is essential in effecting transfer of the wire from one reel to the other that the take-up reel be urged in a non-positive manner at a peripheral speed somewhat greater than the peripheral speed of the supply reel. In order to accomplish this result, non-positive driving means are provided interconnecting the supply and take-up reels. This driving means is best illustrated in Figure 1 and comprises a pair of metal discs 22 and 24 which are clamped together adjacent their center by a pair of suitable clamping means indicated generally at 26. The arrangement is such that a substantial peripheral portion of the discs is free and is adapted to enclose discs 28 and 30 which are respectively secured for simultaneous rotation with the supply and take-up reels 18 and 20. Inasmuch as the discs 22, 24 are formed of metal and are therefore somewhat resilient, they are sprung apart and consequently engage the periphery of the discs 28 and 30. Moreover, the area of contact between the double discs 22, 24 and the discs 28 and 30 extends over a substantial angular extent of the discs 28 and 30, and accordingly there is no substantial area at which true rolling contact takes place. Instead, there will be constant slippage between the double discs and the single discs engaged thereby. This will result in a smooth drive which will avoid any tendency to cause uneven motion or surges in the wire.

It is essential that the take-up disc be urged to rotate at a nominally greater peripheral speed than the supply disc and this is accomplished by mounting the double disc 22, 24 for shifting in a direction generally parallel to a line joining the axes of the discs 28 and 30. Accordingly, with the disposition of parts seen in Figure 4, it may be assumed that the disc 28 is connected to the supply reel and the disc 30 connected to the take-up reel. The double disc construction is mounted for rotation on a bearing 34 carried by a reversing control lever 35 which is pivoted, as indicated at 37.

Figures 4, 5, 6, 7:
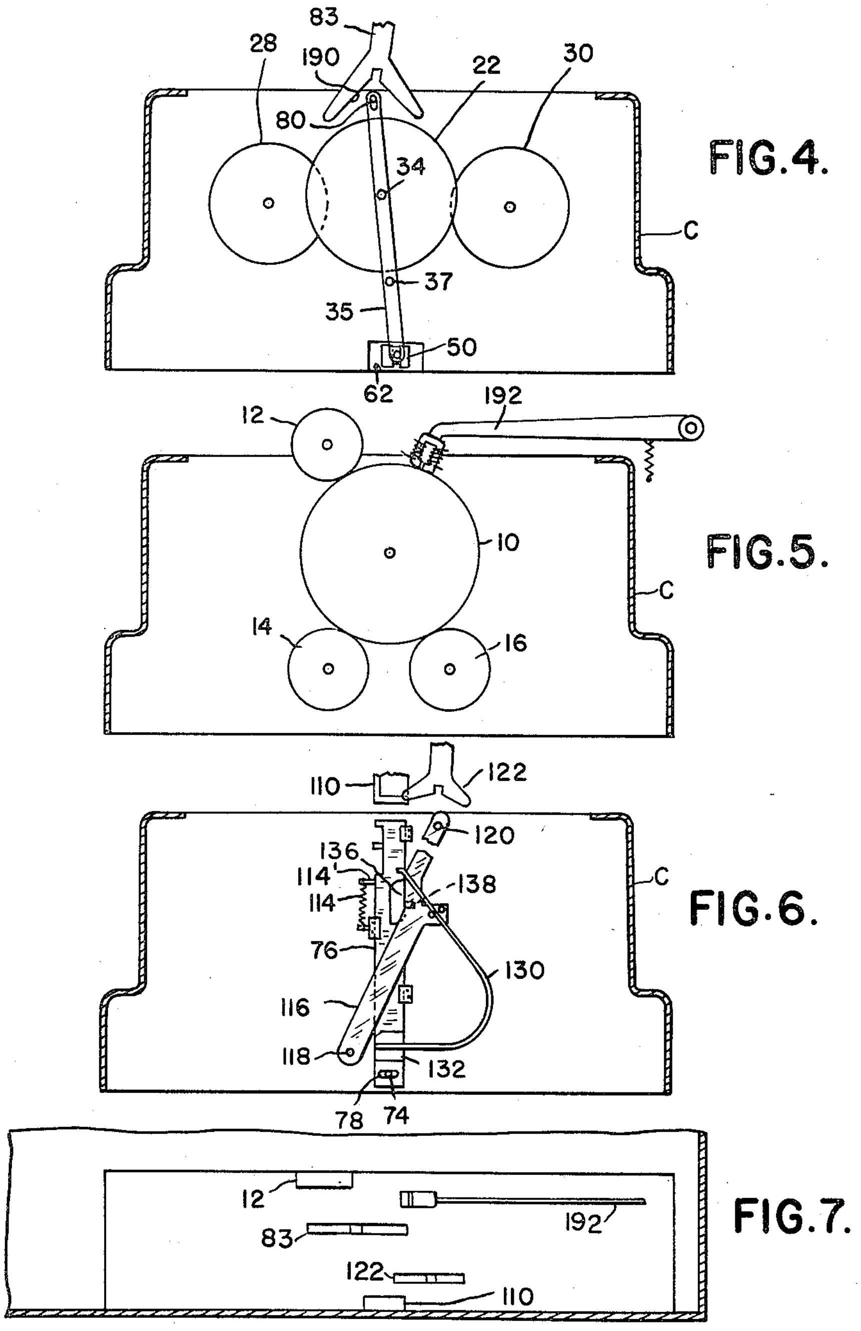
Figure 4 is a fragmentary sectional view through the cartridge showing the wire drive reversing lever and associated parts.
Figure 5 is a fragmentary sectional view through the cartridge showing the wire drive capstan, pick-up head, and associated parts.
Figure 6 is a fragmentary sectional view through the cartridge showing the level wind drive slide, reversing lever, and associated parts.
Figure 7 is a fragmentary elevation of a portion of the cabinet, showing the location of parts associated with the cartridge.

Suitable means are provided in the cabinet for effecting shifting of the lever 35 from the position shown in Figure 4 to a position in which it overlies a larger extent of the disc 30 than it does of the disc 28. In this position, it is effective to urge a higher relative peripheral speed upon the disc 28 than it receives from the disc 30, which is the requisite condition when the reel connected to the disc 30 is the supply reel and the reel connected to the disc 28 is the take-up reel. It will be understood that this last mentioned condition takes place during rewinding of the wire.

In order to control the winding of wire on the take-up reel, it is essential that means be provided for effecting level winding of the wire on the reel. Mechanism for accomplishing this result is best illustrated in Figures 1 to 3. This means constitutes a pair of sheaves 40, each of which is mounted in a pivoted bracket 42 connected to a shaft 44. A pair of such shafts 44 are provided, the intermediate portions of which are offset, as best seen in Figure 1. It is desirable that only the sheave which is associated with the take-up reel shall be positively driven. The other sheave which is at the moment associated with the reel which is operating as the supply reel should be loose so that it may accommodate itself to lateral displacement of the wire as it is unwound from the reel.

Figures 10, 11:
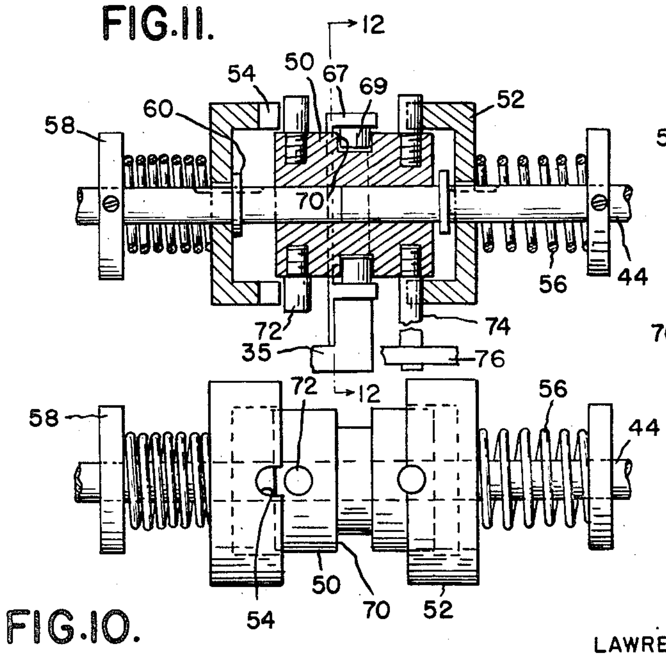
Figure 10 is a plan view of the reversible connection for the level wind device.
Figure 11 is a longitudinal section of the structure shown in Figure 10.

In order to accomplish this result, the clutch mechanism best illustrated in Figures 1 to 3 and 10 to 12 is provided. The inner ends of the shafts 44 are received within an actuator block 50 and each of the shafts 44 has splined thereto a cup-shaped coupling member 52 which is provided with a pair of recesses 54, as best seen in Figure 10. Coupling members 52 are spring biased by compression springs 56, seating against spring seats 58 toward engaging position, but are limited as to movement toward engaging position by stop members 60.

Figure 9:
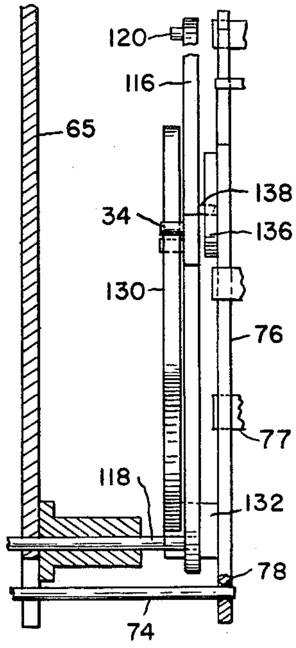
Figure 9 is a side elevation, partly in section, of the structure shown in Figure 8.
Figure 12:
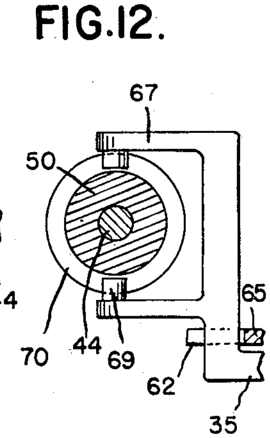
Figure 12 is a transverse sectional view on the line 12—12 of Figure 11.
Figure 13:
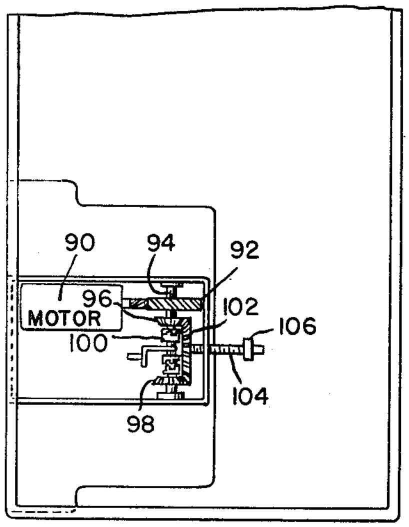
Figure 13 is a fragmentary horizontal sectional view through the cabinet, showing the reversible level wind drive.

Means are provided for shifting the actuator block 50 into engagement with one or the other of the coupling members 52, and this means is carried at the outer end of the reversing control lever 35. As best seen in Figure 12, the outer end of the reversing control lever 35 is shaped to extend through a recess 62 formed in the supporting plate 65 and includes a pair of ears 67 having inwardly extending pins 69 which engage in an annular groove 70 formed in the actuator block 50. The actuator block 50 is provided with pins 72 adapted to seat in the recesses 54. Three of these pins are employed and a fourth pin 74 is provided which extends completely across the plate 65 through the recess 62 in the edge thereof and is engaged by an actuator slide 76 mounted for reciprocation in a guide formed by members 77 on the inner surface of a case C of the cartridge. Means later to be described are provided for effecting back and forth reciprocation of the slide 76 and consequent oscillation of the actuator block 50. The actuator slide has a slot 78 which receives the end of the elongated pin 74, so that reciprocation of the slide results in oscillation of the block 50. The relationship is best illustrated in Figure 9 where it will be observed that vertical movement of the plate 76 will, through the pin 74, cause rocking motion of the block 50 about its axis. As previously described, the block 50 will be shifted axially to one of two limiting positions in which the pins 72 or the elongated pin 74 will be received in the notches 54 of one of the cup elements 52 so that back and forth oscillation of the block 50 about its axis as previously described, results in corresponding oscillation of one cup element 52. This in turn results in oscillation of one of the shafts 44 and corresponding oscillation of the sheave 40 connected to the shaft. This will result in level winding of the reel.

As will be readily apparent, shifting of the block 50 into engagement with one or the other of the two coupling members 52 will have the effect of connecting one or the other of the level wind sheaves 40 to its driving means, and disconnecting the other for free oscillation. The sheave cooperating with the reel which is acting as the take-up reel is thus driven to effect level winding of wire thereon, and the sheave associated with the supply reel is free to follow the wire as it is drawn off from the supply reel. During reversal of wire feed, as during rewinding, the connections to the sheaves are reversed.

Figure 16:
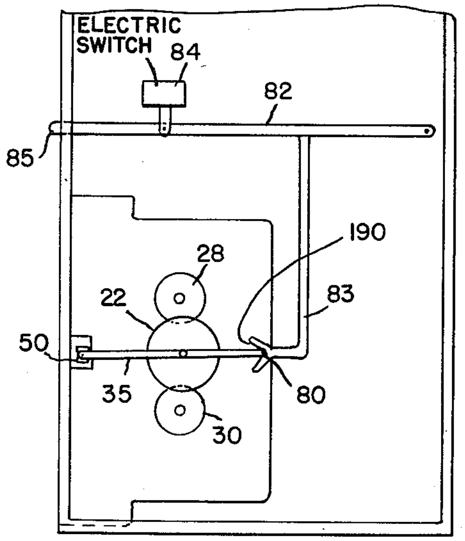
Figure 16 is a view similar to Figure 13, showing the operation of the reversing control lever.

As best seen in Figure 16, the reversing control lever 35 carries a pin 80 at its inner end, and the cabinet has a manual actuating lever 82 for reversing rotation of the main driving motor and for shifting the reversing control lever 35 between limiting positions. Lever 82 is provided with a forked arm 83 to receive the pin 80. Associated with the lever 82 in the cabinet is a switch diagrammatically indicated at 84 in Figure 16, which reverses the direction of rotation of the main driving motor and makes appropriate circuit changes, as will be explained in detail subsequently. The lever 82 has a portion 85 accessible for manipulation from the exterior of the cabinet, marked for example as "Play" and "Rewind" for its two limiting positions. Movement of this lever results in corresponding shifting of the lever 35 between its limiting positions, and results in simultaneously reversing connections to the motor, shifting the double friction drive discs 22, 24 so as to effect higher peripheral non-positive drive to the reel which is acting as the take-up reel, and connecting the level wind sheave associated with the take-up reel for positive drive. Inasmuch as the coupling member 52 may not be in position to engage the pins carried by the block 50, the springs 56 are provided to permit yielding of the coupling member until the recesses 54 therein register with the pins.

The means for reciprocating the slide 76 is best seen in Figures 6, 8, 9, 13 and 14. Located in the cabinet is a level wind drive motor 90 (Figures 13 and 14) which drives a worm gear 92. The gear 92 is keyed or otherwise secured to a shaft 94, which carries two bevel gears 96 and 98 mounted for rotation thereon. Intermediate the bevel gears is a clutch element 100 splined to the shaft, and which may be shifted into engagement with correspondingly shaped clutch elements secured to the bevel gears. This permits positive drive of one or the other of the two bevel gears, the other being reversely driven through a larger bevel gear 102 which remains in mesh with the bevel gears 96 and 98. The large bevel gear 102 drives a threaded shaft 104, which effects travel of a nut 106.

A lever 110 (Figure 14) is pivoted intermediate its ends as seen at 112, and carries the nut 106 at its upper end. The lower end of the lever 110 enters the cartridge and directly engages the slide 76, as best indicated in Figure 6. In order that the lever 110 can control motion of the slide in both directions, while at the same time avoiding the necessity for a two-way driving connection between the parts, the slide 76 is spring biased in one direction by a spring 114 secured at one end to a pin 114' carried by plate 65 of the cartridge.

Figure 14:
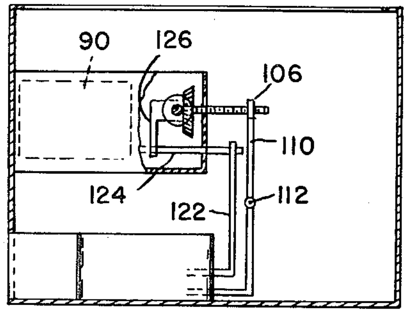
Figure 14 is a fragmentary vertical sectional view through the cabinet showing the driving connections between the level wind drive, and the connections for reversing the level wind clutch.

Associated with the slide 76 is a snap-acting level wind reversing lever 116. This lever is pivoted to the plate 65 as by the pin 118, and at its opposite end carries a pin 120 which engages the slotted end of a lever 122 (Figures 6 and 14). Lever 122 is connected to a shaft 124 which carries an arm 126 engageable with the clutch element 100. As the lever 116 moves with a snap action between its limiting positions, it snaps the clutch from side to side, and so operates to reverse the direction of rotation of the screw 104, and consequently the direction of reciprocation of the slide 76.

Snap action reversal of the lever 116 is accomplished by a leaf spring 130 mounted at one end in a supporting block 132 carried by the slide 76. The other end of the spring has a portion extending diagonally with respect to the direction of motion of the slide. The lever 116 is provided with a pair of spaced pins 134. On the surface of the slide 76 is a cam block 136, and a cam follower 138 carried by the lever 116 engages the cam.

Figure 8:
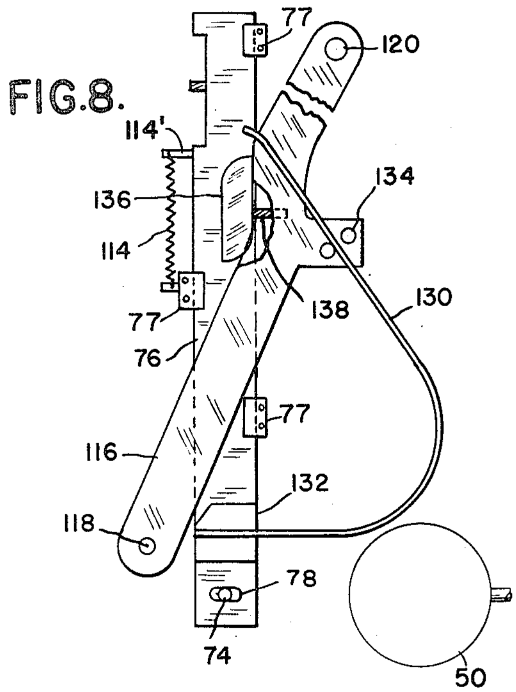
Figure 8 is a plan view of the level wind drive slide and reversing lever.

The action of this structure is best understood by referring to Figure 8. In this figure the lever 116 has been swung in clockwise direction, the slide 76 is moving downwardly, and the spring 130 is being increasingly stressed to urge the lever 116 in a counterclockwise direction. Movement of the lever is of course prevented by engagement between the cam follower 138 carried by the lever 116 with the cam 136 carried by the slide 76. As soon as the cam follower reaches the end of the cam, it permits the lever to snap to its other limiting position, thus reversing the direction of travel of the slide.

Figure 15:
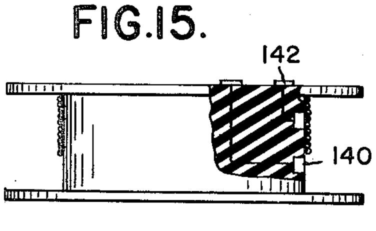
Figure 15 is a diagrammatic view, partly in section, of a reel, showing the circuit controlling contacts responsive to the amount of wire on the reel.

Automatic means are provided for preventing complete withdrawal of the wire from either of the reels 28 or 30. This means takes the form of a pair of contacts 140 spaced apart axially of the reel, as best illustrated in Figure 15. It will be understood that in this construction the reel itself is made of a non-conductive material. The contacts 140 are connected to conducting rings 142 located at one side of the reels. Brushes indicated diagrammatically at 144 (Figure 17) contact the rings, and are connected into the circuit controlling the driving motors located in the cabinet. For this purpose suitable connecting plugs and sockets are provided which are automatically engaged when the cartridge is inserted into the cabinet.

Figure 17:
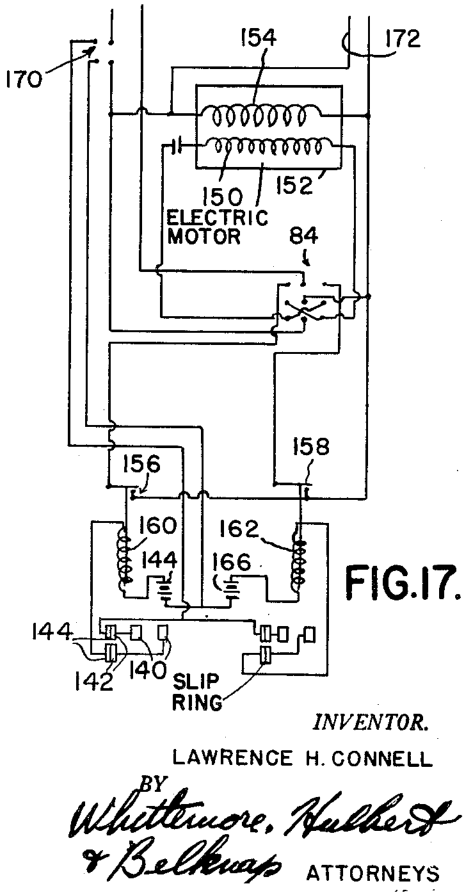
Figure 17 is a wiring diagram showing the circuit for reversing the main wire drive.

In the wiring diagram of Figure 17, the reversing switch 84 controlled by the reversing lever 82 reverses the direction of flow of current through the auxiliary windings 150 of the main motor 152, the main windings of which are indicated at 154. A pair of solenoid controlled switches 156 and 158 are provided in the motor circuit, and the solenoids 160 and 162 for controlling these switches are connected in series with the slip rings 142. As long as sufficient wire remains on the appropriate reel, a series circuit is completed through the wire between the contacts 140. However, as soon as the wire leaves one of the contacts 140, the circuit through the solenoid windings is interrupted, thus opening the appropriate one of the switches 156 or 158. In the diagram, the source of current for the solenoid windings is indicated as batteries 164 and 166, but any other suitable source could be employed. A main on-and-off switch, controlling the motor circuits as well as the solenoid circuits, is indicated at 170, and is mounted on the exterior of the cabinet for ready manipulation.

While a single motor could be employed if desired, it is preferred to provide separate motors for wire feed and for level winding, and connections to the level wind motor 90 are indicated at 172.

Conveniently, all of the devices in the cartridge may be mounted on a single mounting plate or panel 65 as previously described. This plate has the outline best seen in Figure 1. It is provided with a cut-out portion at 62, through which the offset portion of the reversing control lever 35 extends. The plate has ears 180 turned up at the sides of the opening 62, which are employed to support the inner ends of the shafts 44. Similar ears 182 are turned up from the plate at opposite corners to support the outer ends of shafts. As best seen in Figure 3, openings 184 are formed in the plate through which the level wind sheaves extend.

As previously described, the cartridge is designed to be operatively connected to the driving mechanism permanently mounted in the cabinet by the simple act of inserting it into a correspondingly shaped recess in the cabinet. This arrangement is best seen in Figures 4 through 7. Reversing control lever 35 engages the manual actuating lever 82 mounted in the cabinet. The free end of lever 82 is forked and slotted to receive the pin 80 on the lever 35. If it should happen that the pin 80 is out of alignment with the slot on the lever 82, it will be shifted into alignment by camming surfaces 190 provided adjacent the slot, thus shifting lever 35 into correct position.

Referring now to Figures 5 and 7, it will be observed that the capstan 10 moves into engagement with the driving roller 12, when the cartridge is inserted, and that it also engages the pick-up or recording head carried by a spring biased arm 192. Since the wire is led around the capstan, this brings the wire into operating relation with the pick-up or recording head.

Figures 6 and 7 illustrate the manner in which the slide 76 engages the lower end of the lever 110, and the level wind reversing lever 116 becomes associated with the lever 122. Again, the slotted end of the lever 122 has camming surfaces which will shift the lever 122 so as to permit the pin 120 to enter the slot in the lever 122. It will be understood that in Figures 4 and 6 the engaging elements provided in the housing and the cartridge are shown separated for clarity. Thus, in Figure 6 it will be appreciated that when the cartridge is fully inserted the upper end of the slide 76 as seen in this figure abuts against the square end of the lever 110. At the same time full insertion of the cartridge brings the pin 120 on the lever 116 into the notch at the end of the lever 122. In like manner, full insertion of the cartridge from the position shown in Figure 4 will cause pin 80 to engage in the notch at the forked end 83 of the lever 82.

Since rotation of the double driving discs 22, 24 may exert a substantial force tending to shift the lever 82, this lever is preferably latched in either limiting position, as for example by forming the lever of a resilient construction and providing a guiding slot for movement of its free end, the slot having notches at either end.

The present construction is exceedingly simple, and permits the greatest ease of operation, since it is only necessary to insert a cartridge, and turn on the main switch. If the control lever is in play position, the apparatus is ready for instant use. When a reel has unwound, the machine automatically stops, and it is necessary only to shift the control lever to "Rewind" to accomplish this result. The interlocks between the various parts effectively prevent snarling of the wire, and insures that the most inexperienced operator use the apparatus without danger of damage thereto.

While the means for varying the drive ratio between the reels has been illustrated as requiring relative shifting between drive discs in a direction generally radial thereof, it will be apparent that equivalent results could be obtained by relative axial movement or relative angular movement to shift contact from the periphery of one disc to a zone inward of its periphery, while effecting a reverse change in the zone of contact of the other disc. This of course would result in a relatively abrupt shift in driving ratios, rather than a gradual shift resulting from radial movement.

Furthermore, the present design results in the greatest economy in manufacture, since the replaceable cartridges contain a minimum of relatively inexpensive parts while the cabinet contains all of the more expensive and complicated apparatus.

While the structure has been described with particular reference to the use of wire as a recording element, it will be understood that certain features of the apparatus will be equally useful in conjunction with tape or other record material, and it is to be understood that these are included within the present invention.

The drawings and the foregoing specification constitute a description of the improved magnetic sound recording apparatus in such full, clear, concise and exact terms as to enable any person skilled in the art to practice the invention, the scope of which is indicated by the appended claims.

What I claim as my invention is:

1. In a wire record apparatus a pair of reels, reversible wire feeding means operable to draw wire from one or the other of said reels, non-positive drive means interconnecting said reels comprising three discs, one connected to each of said reels and the third overlapping and in frictional side contact with the first two discs, and means for shifting said third disc to vary the effective drive ratio between said third disc and said first two discs.

2. In a wire record apparatus a pair of reels, reversible wire feeding means operable to draw wire from one or the other of said reels, non-positive drive means interconnecting said reels comprising three discs, one connected to each of said reels and the third overlapping and in frictional side contact with the first two discs, and means for relatively shifting said discs to vary the effective drive ratio between said third disc and said first two discs.

3. Wire record apparatus comprising a reel onto which wire is wound, a level wind device having a portion movable transversely of said reel, motive means for said device comprising a pair of independently movable members, a reversible drive for one of said members effective to move said member slowly between limiting positions, resilient means between said two members biased in opposite directions during the travel of said one member between limiting positions, abutting means on said members preventing movement of the other member except as said one member reaches limiting position, whereby said other member moves with a snap action between two limiting positions as said one member reaches its limiting position, and means connected to said other member for reversing said reversible drive.

4. Wire record apparatus comprising a reel onto which wire is wound, a level wind device having a portion movable transversely of said reel, motive means for said device comprising a slide reciprocable between two limiting positions, an abutment on said slide, a lever having an abutment thereon slidably engageable with the abutment on said slide, spring means intermediate said slide and lever disposed to bias said lever in opposite directions as said slide approaches opposite ends of its stroke, said abutment being shaped to disengage as said slide reaches limiting position to permit reverse snap action of said lever at the ends of the stroke of said slide, and means operable by said lever for reversing the direction of travel of said slide upon snap action of said lever.

5. Wire record apparatus comprising a replaceable cartridge, a panel in said cartridge, a wire feed capstan pivoted to one side of said panel, a pair of rollers in contact therewith, a pair of reels pivoted to the other side of said panel, a pair of level wind sheaves having portions on opposite sides of said panel and located to receive wire from one reel, guide it to the capstan, receive wire from the capstan, and level wind it onto the other reel.

6. Wire record apparatus comprising a replaceable cartridge provided with a wire feeding capstan, a pair of rollers in contact with said capstan, a pair of reels, a pair of level wind sheaves located to receive wire from one reel, guide it to the capstan, receive wire from the capstan, and level wind it onto the other reel, sheave drive means for oscillating said sheaves, shiftable friction drive means intermediate said reels and effective to cause the winding reel to maintain tension on the wire, and clutch means for said level wind sheaves to connect the sheave associated with the take-up reel to said sheave drive means and to disconnect the other of said sheaves from said sheave drive means.

7. Wire record apparatus comprising a replaceable cartridge, a panel in said cartridge, a wire feeding capstan pivoted to one side of said panel, a pair of rollers in contact therewith, a pair of reels pivoted to the other side of said panel, a pair of level wind sheaves having portions on opposite sides of said panel and located to receive wire from one reel, guide it to the capstan, receive wire from the capstan, and level wind it onto the other reel, sheave drive means for oscillating said sheaves, shiftable friction drive means intermediate said reels and effective to cause the winding reel to maintain tension on the wire, and clutch means for said level wind sheaves to connect the sheave associated with the take-up reel to said sheave drive means and to disconnect the other of said sheaves from said sheave drive means.

8. A wire record apparatus comprising a cabinet, a motor, a level wind actuator driven by said motor, and movable reversing means for said actuator, all permanently mounted in said cabinet; a removable and replaceable cartridge, comprising a pair of reels therein, a level wind device, and a movable member for actuating said reversing means; said movable member and reversing means having parts mechanically engaged upon insertion of the cartridge into the cabinet, said parts including camming surfaces to shift said movable reversing means into position as determined by the position of said movable member to initiate operation of said level wind device in the proper direction as required by the position and proper direction of movement thereof.

9. Wire record apparatus comprising a cartridge, a pair of record wire reels, reversible friction drive means connecting said reels, a reversing member for said friction drive means to reverse the drive ratio thereof, all of said parts being permanently carried by said cartridge; a cabinet for receiving said cartridge comprising a reversible motor, a drive rotor connected thereto for driving said reels, a friction drive reversing actuator mechanically engageable with said reversing member, and a manual control member movable to reverse said motor and to position said reversing actuator in proper position to effect the required setting of said reversing member; and cam means intermediate said reversing member and reversing actuator to shift said reversing member to a position determined by the position of said reversing actuator upon insertion of said cartridge in said cabinet.

10. Wire record apparatus comprising a cartridge, a pair of wire carrying reels, a selectively operable level wind device for each of said reels, and a movable actuator for selectively rendering either of said devices operable to level wind, all of said parts being permanently carried by said cartridge; a cabinet including reversible drive means for said reels, a movable member controlling the direction of rotation of said drive means, said member having a portion mechanically engageable with said actuator upon insertion of said cartridge, said member and actuator having cam surfaces effective to shift said actuator to a position determined by position of said member upon insertion of said cartridge to provide operation of the level wind device associated with the reel operating as the take-up reel.

11. A wire record apparatus comprising a cabinet, a motor, a level wind actuator driven by said motor, and movable reversing means for said actuator, all permanently mounted in said cabinet; a removable and replaceable cartridge, comprising a pair of reels thereon, a level wind device, and a movable member for actuating said reversing means; said movable member and reversing means having parts mechanically engaged upon insertion of the cartridge into the cabinet.

12. A wire record apparatus comprising a cabinet, a motor, a level wind actuator driven by said motor, and movable reversing means for said actuator, all permanently mounted in said cabinet; a removable and replaceable cartridge, comprising a pair of reels thereon, a level wind device, and a movable member operable in timed relation to said level wind device for actuating said reversing means; said movable member and reversing means having parts mechanically engaged upon insertion of the cartridge into the cabinet.

13. Wire record apparatus comprising a cartridge, a pair of record wire reels, reversible friction drive means connecting said reels, and a reversing member for said friction drive means to reverse the drive ratio thereof, all of said parts being permanently carried by said cartridge; a cabinet for receiving said cartridge comprising reversible drive means for driving said reels, and a control device movable to reverse said drive means and mechanically engageable with said reversing member to position and effect the required setting of said reversing member; and cam means intermediate said reversing member and control device to shift said reversing member to a position determined by the position of said control device upon insertion of said cartridge in said cabinet.

14. Wire record apparatus comprising a cartridge, a pair of record wire reels, reversible friction drive means connecting said reels, and a reversing member for said friction drive means to reverse the drive ratio thereof, all of said parts being permanently carried by said cartridge; a cabinet for receiving said cartridge comprising reversible drive means for driving said reels, a friction drive reversing actuator mechanically engageable with said reversing member upon insertion of said cartridge in said cabinet, and a manual control member movable to reverse said drive means and to position said reversing actuator in proper position to effect the required setting of said reversing member.

15. Wire record apparatus comprising a cartridge, a pair of record wire reels, reversible friction drive means connecting said reels, and a reversing member for said friction drive means to reverse the drive ratio thereof, all of said parts being permanently carried by said cartridge; a cabinet for receiving said cartridge comprising reversible drive means for driving said reels, and a control device movable to reverse said drive means and mechanically engageable with said reversing member upon insertion of said cartridge in said cabinet to position and effect the required setting of said reversing member.

16. Wire record apparatus comprising a cartridge, a pair of wire carrying reels, a selectively operable level wind device for each of said reels, and a movable actuator for selectively rendering either of said devices operable to level wind, all of said parts being permanently carried by said cartridge; a cabinet including reversible drive means for said reels, a movable member controlling the direction of rotation of said drive means, said member having a portion mechanically engageable with said actuator upon insertion of said cartridge and effective to shift said actuator to a position to provide operation of the level wind device associated with the reel operating as a take-up reel.

17. In apparatus of the character described, a variable drive device comprising a relatively rigid disc, a pair of relatively flexible discs concentrically secured together in side by side relation and having a substantial peripheral portion free for lateral flexing, means for mounting said rigid disc and said flexible discs with their axes parallel and with the peripheral portions of said flexible discs overlapping and contacting opposite sides of said rigid disc, the portions of said flexible discs in contact with said rigid disc being flexed outwardly to establish contact at the periphery of said rigid disc and at a zone displaced inwardly from the periphery of said flexible discs, and means for varying the amount of peripheral overlap between said flexible discs and said rigid disc to vary the drive ratio therebetween.

18. Wire recording apparatus comprising a pair of reels, reversible feeding means for feeding wire from one reel and winding it on another, friction means for urging the reel operating as the winding reel always to a greater peripheral speed than the other reel, a level winding device located to level wind wire onto one of said reels and another level winding device located to level wind wire onto the other reel, power means for operating said level winding devices, clutch means for disconnecting from the power means the level winding device for level winding wire onto the reel operating as the supply reel, and connecting to the power means the level winding device for level winding wire onto the reel operating as the winding reel, and shifting means for said friction means to operate on reversal of wire travel to urge the reel operating upon reversal of wire travel as the winding reel at a greater peripheral speed than the other reel.

19. The apparatus as defined in claim 18, having single operating means for operating said clutch means and said shifting means simultaneously.

20. The apparatus as defined in claim 18, having single operating means for reversing said feeding means, operating said clutch means and said shifting means simultaneously.

21. Wire record apparatus comprising a pair of reels, reversible means for causing wire to be drawn from either reel and wound up on the other, level wind mechanism comprising a pair of sheaves mounted for free oscillation about an axis tangent to the sheaves, one of said sheaves being located to level wind wire onto one of said reels and the other sheave being located to level wind wire onto the other reel, drive means for oscillating said sheaves, and means for connecting to said drive means the sheave for level winding wire onto the reel operating as the take-up reel, and simultaneously disconnecting from said drive means the sheave for level winding wire onto the reel operating as the supply reel to permit free oscillation thereof.

22. Wire record apparatus comprising a pair of reels, friction drive means operable to urge the reel operating as the take-up reel to a greater speed than the other reel including a shiftable drive member effective to reverse the drive ratio between said reels, a level winding device located to level wind wire onto one of said reels and another level winding device located to level wind wire onto the other reel, a single drive means for said level winding devices, clutch means for selectively engaging said drive means with either of said level winding devices including a shiftable part to connect one of said level winding devices to said drive means and simultaneously to disconnect the other level winding device therefrom, and a movable control member to which both said shiftable drive member and said shiftable part are connected to insure connection to said drive means of the level winding device for the reel operating as the take-up reel.

23. Wire recording apparatus comprising a replaceable cartridge having a single plate frame, a pair of reels mounted on said frame, a level winding sheave located to level wind wire onto one of said reels and another level winding sheave located to level wind wire onto the other reel, said sheaves each being mounted on said frame for oscillation about an axis tangent to the periphery thereof, an actuator mounted on said frame, and clutch means for selectively connecting said actuator to either one of said sheaves while simultaneously disconnecting said actuator from the other sheave.

References Cited in the file of this patent

UNITED STATES PATENTS

| Number | Name | Date |
|---|---|---|
| 1,042,720 | Richards | Oct. 29, 1912 |
| 1,126,317 | Thompson | Jan. 26, 1915 |
| 1,513,403 | Lebeis | Oct. 28, 1924 |
| 1,790,539 | Gorman | Jan. 27, 1931 |
| 1,806,984 | Prout | May 24, 1931 |
| 1,939,181 | McCash et al. | Dec. 12, 1933 |
| 2,091,756 | Fodor | Aug. 31, 1937 |
| 2,183,618 | Magruder | Dec. 19, 1939 |
| 2,346,903 | Caffrey | Apr. 18, 1944 |
| 2,392,226 | Butterworth et al. | Jan. 1, 1946 |
| 2,409,942 | Knapp | Oct. 22, 1946 |
| 2,424,498 | Nygaard | July 22, 1947 |
| 2,438,222 | Lear | Mar. 23, 1948 |
| 2,484,552 | Camras | Oct. 11, 1949 |
| 2,500,903 | Neff | Mar. 14, 1950 |
| 2,525,995 | Barbara et al. | Oct. 17, 1950 |
| 2,535,478 | Arndt, Jr., et al. | Dec. 28, 1950 |
| 2,543,125 | Owens | Feb. 27, 1951 |
| 2,603,425 | Barbara et al. | July 15, 1952 |

FOREIGN PATENTS

| Number | Country | Date |
|---|---|---|
| 613,009 | France | Aug. 13, 1926 |